United States Patent Office 3,067,171
Patented Dec. 4, 1962

3,067,171
PROCESS FOR THE PRODUCTION OF SYNTHETIC RESINS
Manfred Hoppe, Chur, Switzerland, assignor to Inventa AG. fuer Forschung und Patentverwertung, Zurich, Switzerland
No Drawing. Filed Dec. 30, 1959, Ser. No. 862,753
Claims priority, application Switzerland Feb. 12, 1959
2 Claims. (Cl. 260—47)

As is known, aromatic di- and polyoxy compounds in an aqueous medium can be reacted with epoxyhalides or with dihalide hydrins, in the presence of the required amounts of alkali, to di- or polyglycid ethers of the following constitution:

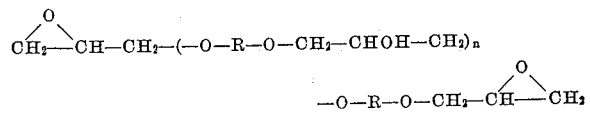

wherein R is an aromatic radical and $n$ is a whole number.

The aliphatic or aromatic carboxylic acids are used in form of dry alkali salts or in the presence of no more than catalytic amounts of water, preferably less than 1 percent calculated on the reaction mixture, together with a large excess epoxy halide compound at elevated temperatures, also using, if desired, further catalysts such as tertiary nitrogen compounds and quaternary ammonium compounds. The reaction also can be carried out in inert solvents in which the epoxy halide and also the reaction product is soluble. Such solvents are, e.g., ketones, ethers, halogenated hydrocarbons and dioxane. The further operation simply consists in filtering the alkali halide from the solution and distilling the excess epoxy halide and solvent.

Under the same conditions, the acid salts of oxy- and mercaptocarboxylic acids wherein only one reactive hydrogen atom is substituted by alkali, can be reacted with epoxy halide. Thereby compounds are formed which contain glycid esters and glycid ethers or glycid thioethers beside esters, ethers or thioethers of a-chlorohydrin, also addition products containing in the molecule an epoxy group. These compounds can be hardened by acid and basic materials, e.g., amines, organic acid anhydrides, sulfochlorides, sulfonic acids or Friedel-Crafts catalysts, into synthetic resins of excellent mechanical properties, also of resistance to chemicals and temperatures. It is surprising that, contrary to former experiences, these monoglycid ethers are converted into usable synthetic resins not only with trifunctional hardeners.

It now has been found that thermosetting resins can be produced by reaction of epoxy halides or dihalogen hydrins with aromatic oxy- or mercapto acids, whereby at least 2 mols epoxy halide are used per mol acid, the reaction to be conducted in aqueous solution and with addition of the alkali in two steps.

As starting material for the process according to the invention, aromatic oxy- or mercapto carboxylic acids can be employed, e.g., ortho-, meta- and para-oxybenzoic acids or the corresponding mercapto carboxylic acids, furthermore those oxy- or mercapto carboxylic acids which are derived from polynuclear aromatic compounds, e.g., from naphthalene, anthracene, diphenyl, diphenyl ether, diphenyl sulfide, diphenyl methane, benzophenone, diphenylsulfone, diphenylsulfoxide and alkyldiphenyl amines. Both the functional groups may be on the same or on different nuclei. Moreover, the aromatic rings may have, beside carboxyl-, oxy- or sulfydryl groups, still other substituents, e.g., halogen atoms, alkyl or alkoxy groups. The number of the carboxyl-, oxy- or sulfydryl groups present in the molecule is not limited to 1 and may be larger. A special significance of the process resides in the utilization of vanillic acid which is cheaply available on a large scale from lignin.

The reaction of the oxy- or mercapto carboxylic acids is carried out, according to the invention, by dissolving the oxy- or mercapto carboxylic acids in approximately 10–20 percent aqueous alkali and adding with agitation and at temperatures of 20–100° C., preferably at 50–100° C., the stoichiometrical amount epoxy halide. In the first step, 1 mol alkali are applied per mol oxy- or mercapto carboxylic acid. The pH value before addition of the epichlorohydrin should be approximately 7 although a slight deviation therefrom has no disadvantageous effect. For mol oxy- or mercapto carboxylic acid, 2 mols epichlorohydrin are added. After at least 2 hours agitation of the reaction mixture, preferably 4 hours, at the temperatures named above, the remaining portion of the alkali is added in aqueous solution, preferably in 20–30 percent solution, or dry with intensive agitation. Particularly good yields are obtained by addition of exactly the amount of alkali required for neutralization. The mixture is continued to be agitated for 30 minutes thereafter without external heating whereby a resin forms which can be refined in the usual manner either by dissolving it in acetone and filtration of the salts adhering to the crude resin or by washing with water. By drying in vacuo or else at normal pressure at temperatures up to approximately 120–130° C., a clear resin is obtained. The yields are very good.

Any non-reacted oxy- or mercaptocarboxylic acid can be recovered as glycid ether carboxylic acid by acidulation of the remaining liquor and can be reused.

The course of the reaction can be explained in such a manner that, after a reactive hydrogen atom has been replaced by a base, by the action of 1 mol epichlorohydrin under splitting off, e.g., alkali halide, an epoxy ester or epoxy ether or epoxy thioether forms. The unneutralized reactive hydrogen atom still present in the molecule then reacts with a further mol epichlorohydrin or else with an epoxy group of the epoxy ether, epoxy ester or epoxy thioether already formed under splitting of the ring and thus leads to 1.2-chlorohydrins or to addition compounds. By further addition of alkali, the 1.2-chlorohydrins then are converted into epoxy compounds under splitting off of alkali halide. In the simplest case, using a simple organic oxycarboxylic acid and epichlorohydrin as starting products, the following formula for the composition of the compound formed containing more than one epoxy group obtains:

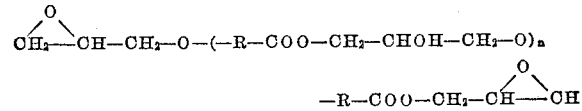

wherein R is an aromatic radical and $n$ is a small whole number.

This formula can be substantiated by the determination of the epoxy value, saponification value, hydroxyl value and molecular weight. When insufficient HCl has split off from the 1.2-chlorohydrin, chlorine still is found.

A saponification of the epoxy esters under the conditions as described cannot be found to take place. However, a change in the process, i.e., addition of the total amount of alkali at the start of the process according to the invention, leads to poor results. The addition of a catalyst, e.g., dimethyl aniline, is of no significance for the course of the reaction.

The resins obtained by this process can be converted in the usual manner and like all other epoxy compounds into technologically valuable synthetic resins by hardening and have the same properties as these. As hardening catalysts all acid and basic compounds can be considered which have been named above for the hardening of epoxy compounds from oxy- or thio-carboxylic acids made by another process.

On the basis of their properties, the synthetic resins made by the process according to the invention are suitable as excellent adhesives for metals and glass and for the production of casting resins, molded bodies, laminates, coatings or insulation.

*Example 1*

In a three-neck flask of 500 ml. capacity, provided with agitator, reflux condenser, thermometer and dropping funnel, 83 g. p-oxybenzoic acid are dissolved in 24 g. sodium hydroxide and 150 ml. water, and between 50 and 60° C. 111.2 g. epichlorohydrin are added within 20 minutes. After holding the reaction mixture at that temperature with agitation for another 4 hours, 24 g. sodium hydroxide are added in small portions and the heating discontinued. After cooling under agitation, the resin formed is washed repeatedly with hot water until the wash fluid is neutral and free of chlorine. The wet resin then is freed from the adhering water in a vacuum drying cabinet until it is entirely clear and transparent.

The analysis gave the following data:

| | |
|---|---|
| Epoxy content per 100 g. resin | 0.430 |
| Saponification value | 257 |
| Molecular weight | 441 |

*Example 2*

101.4 g. vanillic acid are dissolved in the apparatus described above in 24 g. sodium hydroxide and 150 ml. water. At 50–60° C., 111.2 g. epichlorohydrin are added within approximately 20 minutes, and after 4 hours agitation at the same temperature another 24 g. sodium hydroxide are added. The mixture then is allowed to cool. The precipitated resin is washed repeatedly in hot water until the wash fluid is neutral and free of chlorine. After drying in a vacuum drying cabinet a clear and transparent light-colored resin is obtained which has the following analytical data:

| | |
|---|---|
| Epoxy content per 100 g. resin | 0.377 |
| Saponification value | 224 |
| Molecular weight | 494 |

Acid Hardening: 10 parts resin are melted together at approximately 130° C. with 3–5 parts phthalic anhydride, depending upon the size of the epoxy value, and mixed until a clear and slightly viscous solution has formed. The resin then hardens through in a drying oven at 130–140° C. within 5–10 hours and at 180° C. within 1 hour and at this temperature is a rubber-like mass which no longer can be shaped. Instead of phthalic anhydride, other acid anhydrides also can be used. The set resin can excellently be fabricated by mechanical means.

Basic Hardening: 10 parts resin are mixed well with 0.5–2 parts triethylene tetramine whereafter it warms up exothermically. After approximately 5 hours at room temperature the resin has hardened through to a hard mass, and the strength can even be increased considerably by heating for one-half hour at 100° C. By addition of 2–4 parts dibutyl phthalate, the quality of the resin could be improved. Other di- and polyamines also can be used.

*Example 3*

In a round-bottom flask, equipped with agitator, thermometer and reflux condenser, 83 g. p-oxyphenzoic acid and 24 g. sodium hydroxide are dissolved in 150 ml. water and reacted at 50–60° C. with 112 g. epichlorohydrin. After agitation for 4 hours at 90–100° C., the mixture is cooled to 50–60° C., and as much alkali added as is needed for the complete formation of the epoxy groups. This, corresponding to the molecular weight, is approximately 3 g. alkali. The precipitated resin is refined and dried as described above. The yield of epoxy resin is greater than that of the preceding examples because, under the operating conditions, no saponification of the resin already formed can occur.

| | |
|---|---|
| Epoxy content per 100 g. resin | 0.175 |
| Saponification value | 236 |
| Molecular weight (measured in acetone) | 973.1 |

It should be understood that these examples are given merely by way of illustration, not of limitation, and that numerous changes may be made in the details without departing from the spirit and the scope of the invention as hereinafter claimed.

I claim as my invention:

1. A process for the production of thermosetting epoxy ether ester polymers by the reaction of at least two mols epichlorohydrin with one mol of an aromatic oxycarboxylic acid and with addition of more than one and up to two mols alkali, which comprises carrying out said reaction in aqueous solution and with the addition of said alkali in two separate steps.

2. The process as claimed in claim 1, wherein in the first of said two separate steps one mol alkali per 1 mol acid is entered into the reaction and, after termination of said reaction, up to one more mol alkali is entered.

References Cited in the file of this patent

UNITED STATES PATENTS

| | | |
|---|---|---|
| 2,599,974 | Carpenter et al. | June 10, 1952 |
| 2,840,541 | Pezzaglia | June 24, 1958 |
| 2,925,426 | Schroeder | Feb. 16, 1960 |